(12) United States Patent
Murphy et al.

(10) Patent No.: US 10,662,736 B2
(45) Date of Patent: May 26, 2020

(54) HYDROSTATIC EQUALIZING STEM CHECK VALVE

(71) Applicant: Halliburton Energy Services, Inc., Houston, TX (US)

(72) Inventors: Thomas Murphy, Westhill (GB); Peter DW Inglis, Dundee (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/578,017

(22) PCT Filed: Feb. 10, 2017

(86) PCT No.: PCT/US2017/017312
§ 371 (c)(1),
(2) Date: Nov. 29, 2017

(87) PCT Pub. No.: WO2018/147860
PCT Pub. Date: Aug. 16, 2018

(65) Prior Publication Data
US 2019/0376364 A1 Dec. 12, 2019

(51) Int. Cl.
*E21B 34/06* (2006.01)
*F16K 15/04* (2006.01)
*F16K 15/18* (2006.01)

(52) U.S. Cl.
CPC ............ *E21B 34/06* (2013.01); *F16K 15/044* (2013.01); *F16K 15/183* (2013.01)

(58) Field of Classification Search
CPC ............................... E21B 34/102; E21B 34/06
See application file for complete search history.

(56) References Cited

U.S. PATENT DOCUMENTS

| | | | |
|---|---|---|---|
| 5,180,007 A * | 1/1993 | Manke | E21B 23/006 166/240 |
| 6,321,847 B1 | 11/2001 | Brown | |
| 8,701,778 B2 * | 4/2014 | Ringgenberg | E21B 34/10 166/319 |
| 2004/0144938 A1 | 7/2004 | Akselberg | |
| 2010/0200245 A1 * | 8/2010 | Ringgenberg | E21B 34/063 166/375 |
| 2011/0042100 A1 | 2/2011 | O'Neal et al. | |
| 2011/0083859 A1 * | 4/2011 | Scranton | E21B 34/10 166/374 |
| 2012/0273055 A1 | 11/2012 | Lirette et al. | |

(Continued)

OTHER PUBLICATIONS

International Searching Authority, Patent Cooperation Treaty, International Search Report and Written Opinion, International application No. PCT/US2017/017312, entire document, which is a PCT parent to the instant application, dated Oct. 24, 2017.

(Continued)

*Primary Examiner* — Shane Bomar
(74) *Attorney, Agent, or Firm* — Benjamin Fite; C. Tumey Law Group PLLC (57) ABSTRACT

A pressure-activated device is inserted in a string for insertion into a borehole. The pressure-activated device has an indexing mechanism. The pressure-activated device has a piloted check valve that prevents the indexing mechanism from operating unless a pressure on an outside diameter of the pressure-activated device exceeds an activation threshold.

17 Claims, 6 Drawing Sheets

(56) References Cited

U.S. PATENT DOCUMENTS

2014/0284060 A1   9/2014  Ward et al.
2015/0226033 A1   8/2015  Inglis
2015/0369008 A1  12/2015  Shaffer et al.
2017/0074095 A1*  3/2017  Nguyen-Thuyet .... E21B 49/081

OTHER PUBLICATIONS

Halliburton, Completion Solutions, FS Fluid Loss Barrier Valve, entire document, 2015.

* cited by examiner

HYDROSTATIC EQUALIZING STEM CHECK VALVE

BACKGROUND

During completion of a borehole drilled to produce hydrocarbons, a pressure-indexed valve, such as the "formation saver" (FS) valve available from Halliburton, may be placed in the well to separate an upper completion zone from a lower completion zone. The pressure-indexed valve may include an indexing mechanism that may be operated remotely through a series of pressure changes in the borehole to operate the pressure-indexed valve. The indexing mechanism may operate if the pressure on either side of the indexing mechanism is allowed to be different and may not operate if there is no such pressure difference. The pressure-indexed valve may be pressure tested on the surface with the indexing mechanism disabled by equalizing the pressure on either side of the indexing mechanism. It is a challenge to test the pressure-indexed valve on the surface with the indexing mechanism disabled and ensure that the indexing mechanism is enabled when the pressure-indexed valve is inserted into the borehole.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Further, while this disclosure describes a land-based production system, it will be understood that the equipment and techniques described herein are applicable in sea-based systems, multi-lateral wells, all types of production systems, all types of rigs, measurement while drilling ("MWD")/logging while drilling ("LWD") environments, wired drill-pipe environments, coiled tubing (wired and unwired) environments, wireline environments, and similar environments.

The disclosed tool configurations and operations are best understood in the context of the larger systems in which they operate.

Figure 1:
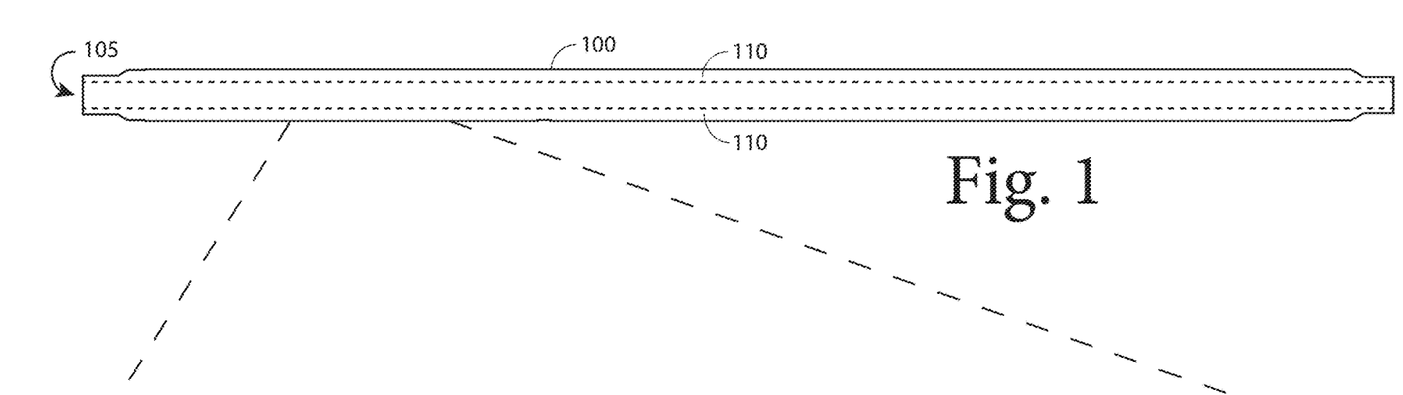
FIG. 1 is a plan view of a pressure-indexed valve.

FIG. 1 is a plan view of a pressure-indexed valve 100, such as the FS valve available from Halliburton.

Figure 2:
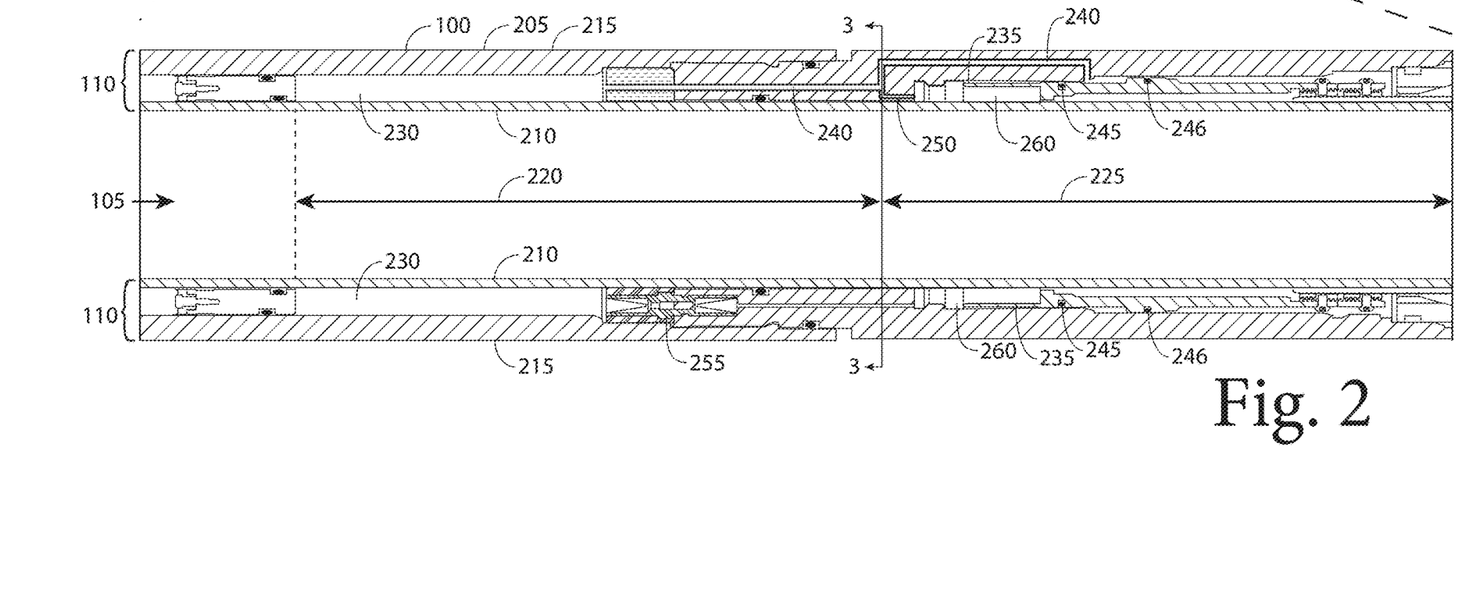
FIG. 2 is a longitudinal cross-sectional view of a portion of the pressure-indexed valve of FIG. 1.

FIG. 2 is a longitudinal cross-sectional view of a portion of the pressure-indexed valve of FIG. 1, where the portion is indicated by the dashed lines extending from FIG. 1 to FIG. 2.

The pressure-indexed valve 100 has a through bore 105 and an annular region 110 that define a tubular housing 205 having an inside diameter 210 and an outside diameter 215. The annular region 110 of the pressure-indexed valve 100 includes an annular low pressure region 220, indicated by line labeled "220," and an annular high pressure region 225, which extends off the edge of FIG. 2 to the right, indicated by the line labeled "225." The low pressure region 220 generally contains fluids at lower pressures than the high pressure region 225, except for an extension of the low pressure region 220 into the high pressure region 225, discussed below. The low pressure region 220 includes a low pressure chamber 230 in the tubular housing 205 between the inside diameter 210 and the outside diameter 215. The high pressure region 225 includes a high pressure chamber 235 in the tubular housing 205 between the inside diameter 210 and the outside diameter 215.

The extension of the low pressure region 220 into the high pressure region 225 is a permanent fluid communication path 240. The permanent fluid communication path 240 is fluidly isolated from the high pressure chamber 235 by O-rings 245 and 246.

The pressure-indexed valve 100 includes an equalizing fluid communication path 250 between the permanent fluid communication path 240 and the high pressure chamber 235. The equalizing fluid communication path 250 may be open, in which case there is two-way fluid communication between the permanent fluid communication path 240 and the high pressure chamber 235. The equalizing fluid communication path 250 may be closed, in which case there is fluid communication from the permanent fluid communication path 240 to the high pressure chamber 235, but not in the opposite direction. The open and closed conditions of the equalized fluid communication path 250 are described below in connection with FIGS. 5 and 6.

The pressure-indexed valve 100 includes a bleed valve 255 between the high pressure chamber 235 and the low pressure chamber 230. The bleed valve 255 slowly "bleeds" pressure from the high pressure chamber 235 to the low pressure chamber 230 until the two pressures are equal.

Consider what occurs when the pressure in the low pressure chamber 230 is raised and the equalized fluid communication path 250 is in its closed condition. Pressures in the permanent fluid communication path 240 and the high pressure chamber 235 will increase to match the pressure in the low pressure chamber 230. When the pressure in the low pressure chamber 230 is reduced, the pressure in the permanent fluid communication path 240 will immediately reduce to the same pressure. The pressure in the high pressure chamber 235 will reduce slowly, at a rate determined by the bleed valve 255, to match the pressure in the low pressure chamber 230. As a result, there will be a period of time when there is a difference in pressure between the permanent fluid communication path 240 and the high pressure chamber 235 when pressure in the low pressure chamber 230 is cycled from a low pressure to a high pressure and back to a low pressure.

The pressure-indexed valve 100 includes an indexing mechanism 260 that is capable of indexing in the presence of a difference between the pressure in the permanent fluid communication path 240 and the pressure in the high pressure chamber 235.

Figure 3:
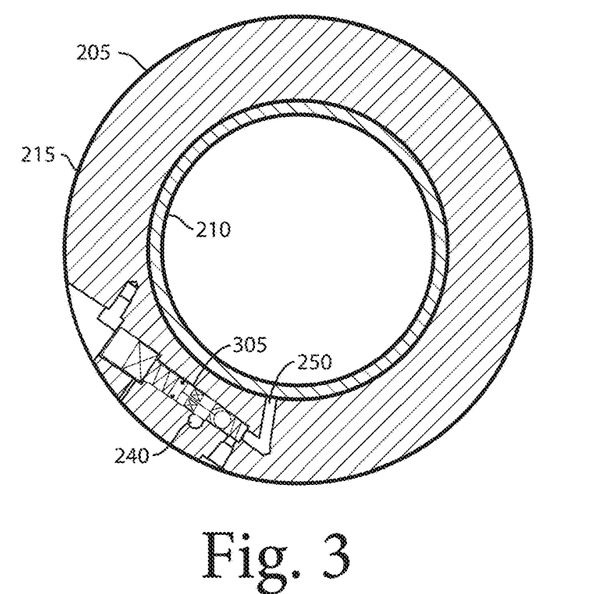
FIG. 3 is an axial cross-sectional view of the pressure indexed valve of FIG. 1.
Figure 4:
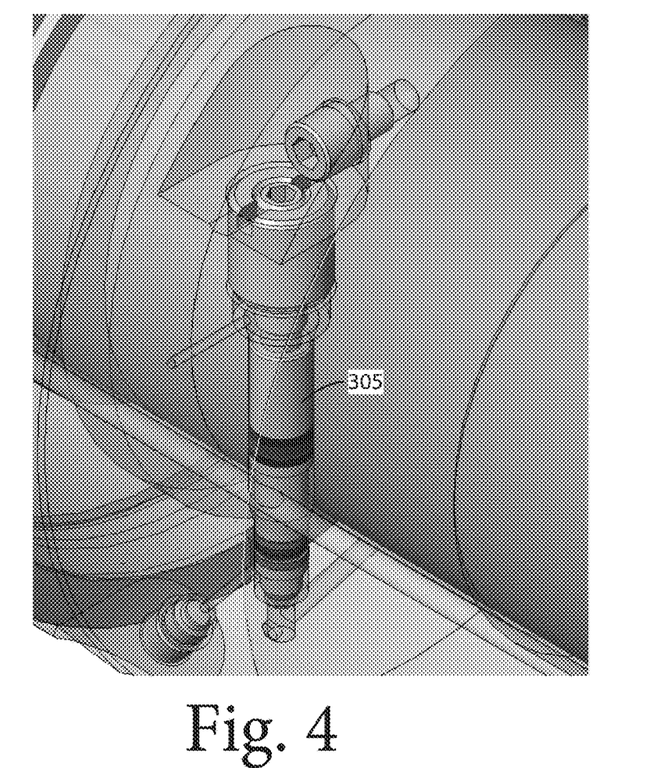
FIG. 4 is a transparent perspective view of a portion of the pressure-indexed valve of FIG. 1.

FIG. 3 is an axial cross-sectional view of the pressure indexed valve 100 of FIG. 1. FIG. 4 is a transparent perspective view of a portion of the pressure-indexed valve of FIG. 1. The pressure-indexed valve 100 includes a check valve 305 (discussed in more detail in connection with FIGS. 5 and 6) that controls whether there is fluid communication between the permanent fluid communication path 240 and the equalizing fluid communication path 250. Conventionally, the check valve 305 has a manual adjustment. The manual adjustment may have an "open" position, in which the equalizing fluid communication path 250 is open, such that there is two-way fluid communication from the permanent fluid communication path 240 to the high pressure chamber 235. The manual adjustment may have a "closed" position, in which the equalizing fluid communication path 250 is closed, such that there is fluid communication from the permanent fluid communication path 240 to high pressure chamber 235 but not in the opposite direction.

Typically, the manual adjustment of the check valve 305 is kept in the open position during pressure testing before the pressure-indexed valve 100 is inserted in a borehole, to prevent the indexing mechanism from operating on the surface. Then, before the pressure-indexed valve 100 is inserted into the borehole, the check valve 305 is changed to the closed position using the manual adjustment. This process is prone to human error. If the check valve 305 is not changed to the closed position before the pressure-indexed valve 100 is inserted in the borehole, the pressure-indexed valve 100 will not index and will not operate properly.

The manually adjusted check valve is replaced by a hydrostatically-operated piloted check valve to reduce the likelihood of human error in use of the pressure-indexed valve.

Figure 5:
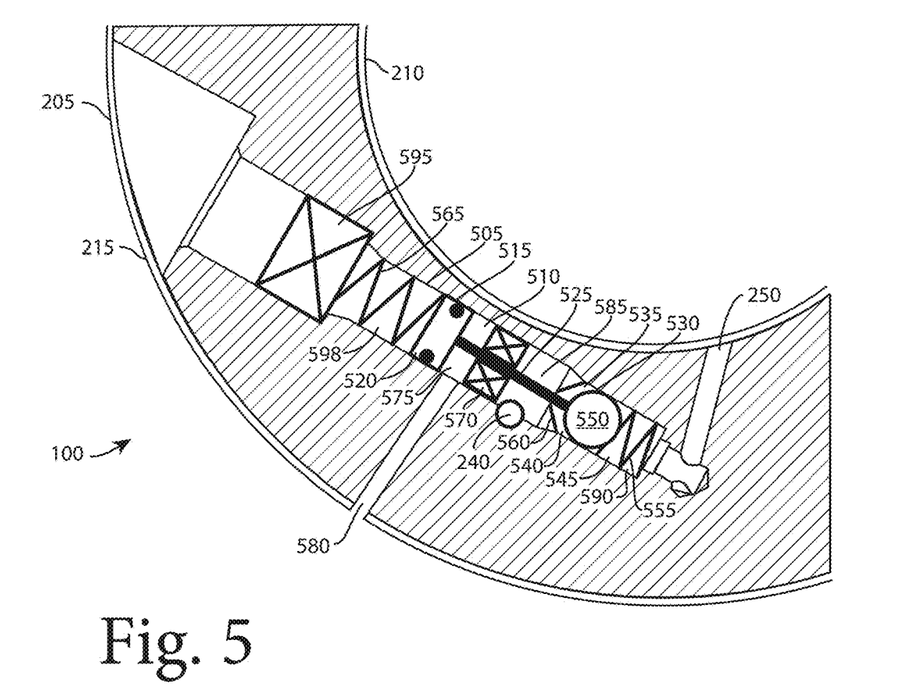
FIG. 5 is a cross-sectional view of the pressure-indexed valve of FIG. 1 showing a hydrostatically-operated piloted check valve in an open position.

FIG. 5 is a cross-sectional view of the pressure-indexed valve 100 of FIG. 1 showing a hydrostatically-operated piloted check valve 505 in its open position. The piloted check valve 505 includes a piston chamber 510 and a piston 515 moveable within the piston chamber 510. The piston 515 includes a cylinder head 520 and a pilot rod 525 extending from the cylinder head 520.

The piloted check valve 505 includes a check valve 530. The check valve 530 includes a check valve chamber 535 extending longitudinally in the direction of movement of the pilot rod 525 and having an upstream side 540 and a downstream side 545. The check valve 530 includes a ball 550 moveable within the check valve chamber 535. The ball 550 is engageable on the upstream side 540 by the pilot rod 530. That is, the ball 550 is engaged with the pilot rod 530 when the piston 515 has moved in the direction of the downstream side 540 and is not engaged with the pilot rod 530 when the piston 515 has moved in the direction of the upstream side 545. The ball 550 is engaged on the downstream side 545 of the check valve chamber 535 by a valve spring 555 that urges the ball 550 in the direction of the upstream side 540 of the check valve chamber 535. The check valve 530 includes a seat 560 against which the ball 550 seals. The check valve 530 permits flow of fluids in only the direction of the downstream side 545 of the check valve chamber 535 when the ball 550 seals against the seat 560.

The piloted check valve 505 includes a piston spring 565 that urges the pilot rod 525 of the piston 515 into engagement with the ball 550 of the check valve 530 and urges the ball 550 away from the seat 560. This action urges the check valve into the open position in which fluids can flow in both directions, i.e., in the direction of the downstream side 545 of the check valve chamber 535 and in the direction of the upstream side 540 of the check valve chamber 535.

The piloted check valve 505 includes a gland 570 that surrounds the pilot rod 525 and an equalizing chamber 575 between the cylinder head 520 of the piston and the gland 570. The piloted check valve 505 includes a hydrostatic fluid communication path 580 between the equalizing chamber 575 and the outside diameter 215 of the tubular housing 205.

The piloted check valve 505 includes an entry chamber 585 between the gland 570 and the check valve 530. The entry chamber 585 is in fluid communication with the low pressure chamber 230 through the permanent fluid communication path 240.

The piloted check valve 505 includes an exit chamber 590 on the opposite side of the check valve 530 from the entry chamber 585. The exit chamber 590 is in fluid communication with the high pressure chamber 235 through the equalizing fluid communication path 250.

The piloted check valve 505 includes a seal plug 595 which seals the piston chamber 510 and provides a backing for the piston spring 565. The piloted check valve 505 includes an atmospheric pressure chamber 598 between the cylinder head 520 and the seal plug 595 that contains trapped atmospheric pressure.

Figure 6:
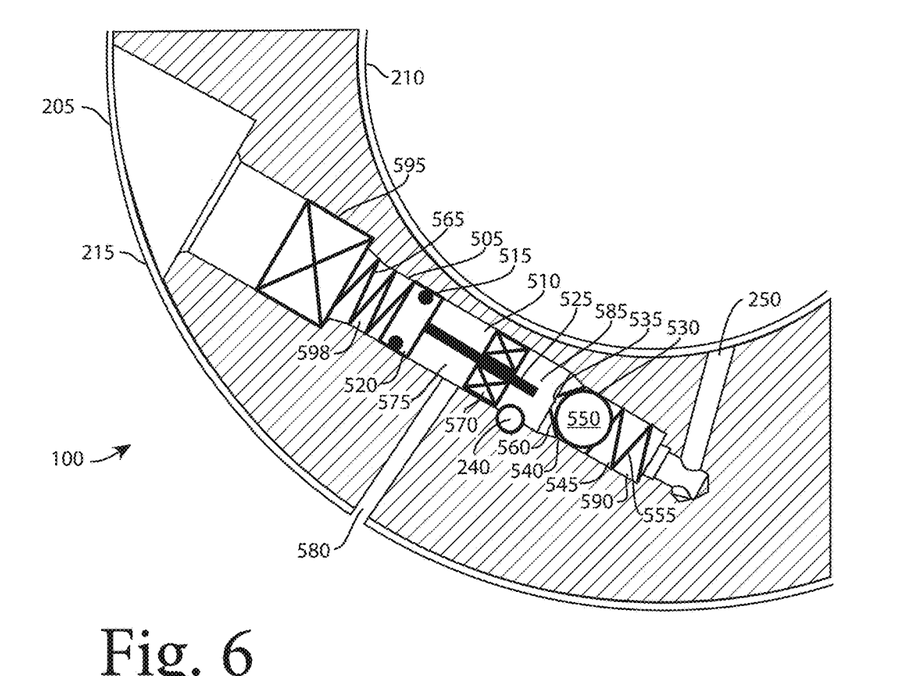
FIG. 6 is a cross-sectional view of the pressure-indexed valve of FIG. 1 showing the hydrostatically-operated piloted check valve of FIG. 5 in a closed position.

FIG. 6 is a cross-sectional view of the pressure-indexed valve 100 of FIG. 1 showing the hydrostatically-operated piloted check valve 505 in its closed position. In the closed position, the piston 515 has moved to compress the piston spring 565. Movement of the piston 515 is typically caused by fluid pressure applied through the hydrostatic fluid communication path 580 into the equalizing chamber 575. The fluid pressure is typically present when the pressure-indexed valve 100 is inserted into a borehole. The piston spring 565 is sized to allow movement of the piston 515 when the pressure outside the pressure-indexed valve 100 communicated through the hydrostatic fluid communication path 580 exceeds an activation pressure.

Because of the movement of the piston 515 illustrated in FIG. 6, pilot rod 525 is no longer in contact with the ball 550. As a result, the ball 550 is positioned against the seat 560. In this position, fluid flow from the permanent fluid communication path 240 through the equalizing fluid communication path 250 is possible, as long as the force exerted by the flowing fluid is enough to compress the valve spring 555 and allow the ball 550 to move away from the seat 560. Fluid flow in the opposite direction (i.e., from the equalizing fluid communication path 250 to the permanent fluid communication path 240) is not possible in the state illustrated in FIG. 6 because such flow is blocked by the seal between the ball 550 and the seat 560.

The piston spring 565 is sized to overcome the valve spring 555 so that the check valve 530 is normally (i.e., in the absence of the activation pressure in the hydrostatic fluid communication path 580 and equalizing chamber 575) in the open position shown in FIG. 5. The check valve 530 moves to the closed position shown in FIG. 6 only when the pressure in the hydrostatic fluid communication path 580 and equalizing chamber 575 equals or exceeds the activation pressure.

There are two possibilities of what will happen after the piston is activated (e.g. moved from the state shown in FIG. 5 to the state shown in FIG. 6) and the pressure-indexed valve 100 is returned to the surface. In the first possibility, shown in FIGS. 5 and 6, the piston 515 is allowed to return to the position shown in FIG. 5, which will reduce the likelihood that any pressure will be trapped in the pressure-indexed valve 100 when it is returned to the surface.

In the second possibility, illustrated in FIGS. 7-10, the piston 515 is latched into the state shown in FIG. 6 and remains in that state even after pressures equalize.

Figure 7:
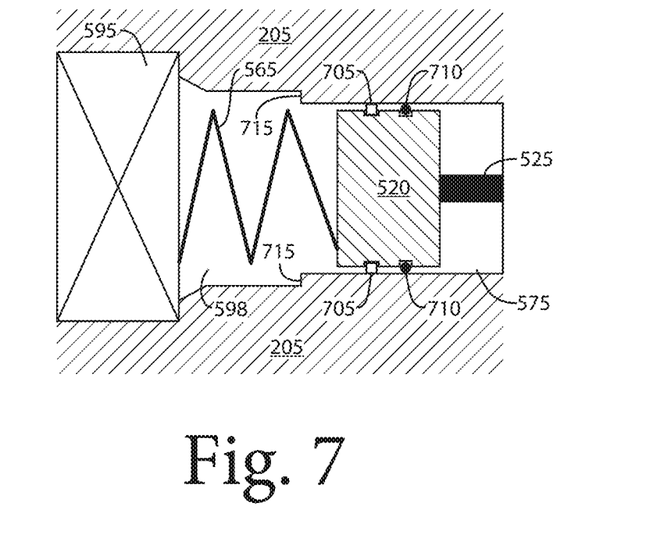
FIG. 7 is a cross-sectional view of a portion of an open hydrostatically-operated piloted check valve with a snap ring stop.

FIG. 7 is a cross-sectional view of a portion of an open hydrostatically-operated piloted check valve with a snap ring stop. A snap ring 705 encircles and is compressed between the cylinder head 520 and the tubular housing 205. An O-ring 710 seals the equalizing chamber 575 from the atmospheric pressure chamber 598. A shoulder 715 in the tubular housing 205 provides a latching surface for the snap ring 705 as described in connection with FIG. 8.

Figure 8:
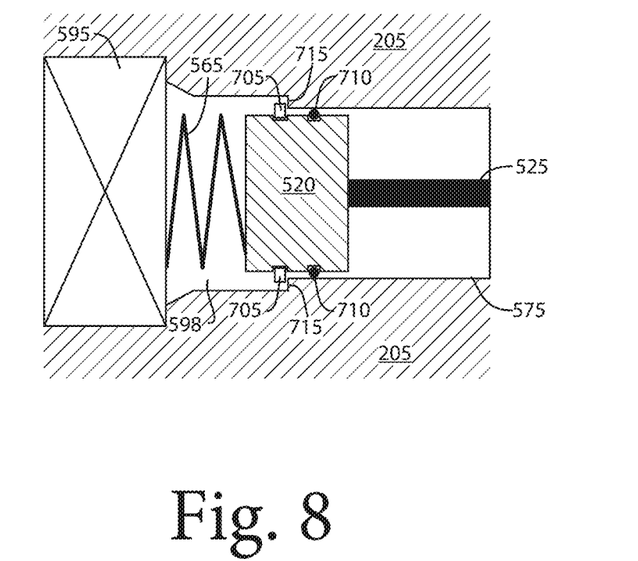
FIG. 8 is a cross-sectional view of the portion of the hydrostatically-operated piloted check valve shown in FIG. 7 with the check valve in a closed position.

FIG. 8 is a cross-sectional view of the portion of the hydrostatically-operated piloted check valve shown in FIG. 7 with the check valve in a closed position. When the cylinder head 520 moves from the open position shown in FIG. 7 to the closed position shown in FIG. 8, the snap ring 705 clears the shoulder 715, snaps outward, and engages with the shoulder 715, which locks the cylinder head 520 into the position shown in FIG. 8.

Figure 9:
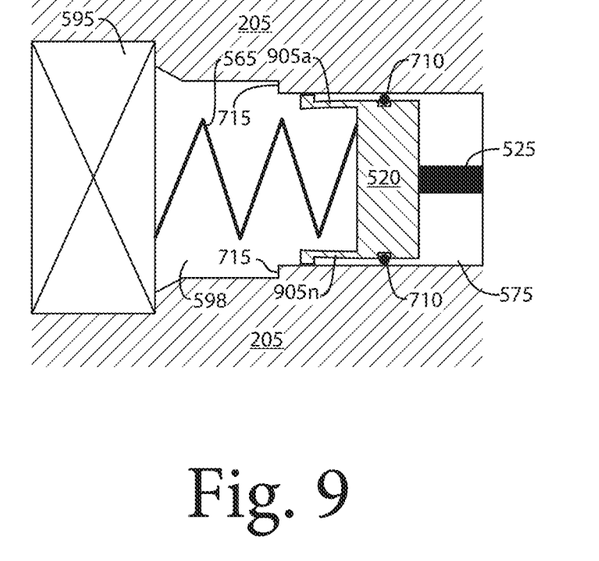
FIG. 9 is a cross-sectional view of a portion of an open hydrostatically-operated piloted check valve with a collet stop.

FIG. 9 is a cross-sectional view of a portion of an open hydrostatically-operated piloted check valve with a collet stop. A plurality of collet fingers 905a-905n (it will be understood that n can be any reasonable number) is distributed around and coupled to the outer edge of the cylinder head 520. It will be understood that the collet fingers can be distributed symmetrically or asymmetrically around the cylinder head 520 In the position shown in FIG. 9, the collet fingers 905a-905n are deflected into the atmospheric pressure chamber 598.

Figure 10:
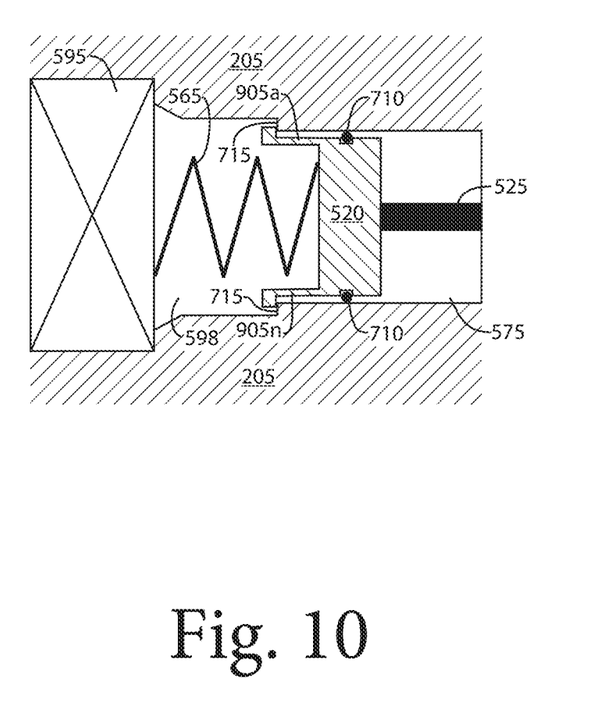
FIG. 10 is a cross-sectional view of the portion of the hydrostatically-operated piloted check valve shown in FIG. 9 with the check valve in a closed position.

FIG. 10 is a cross-sectional view of the portion of the hydrostatically-operated piloted check valve shown in FIG. 9 with the check valve in a closed position. When the cylinder head 520 moves from the open position shown in FIG. 9 to the closed position shown in FIG. 10, the collet fingers 905a-905n clear the shoulder 715 and are no longer forced to deflect. As a result, the collet fingers snap outward and engage with the shoulder 715, which locks the cylinder head 520 into the position shown in FIG. 10.

Figure 11:
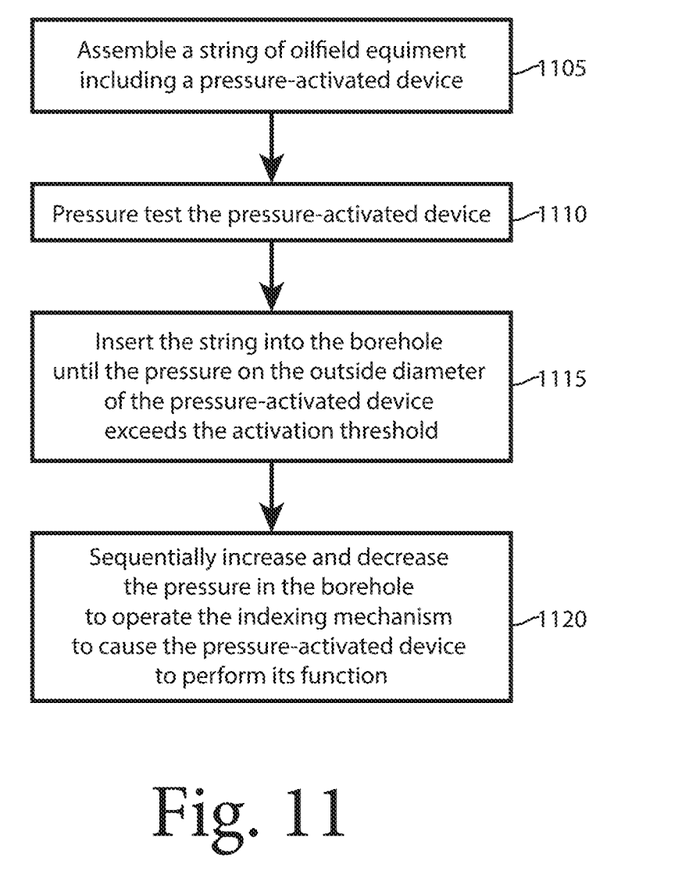
FIG. 11 is a flow chart describing use of the pressure-indexed valve of FIG. 1.

FIG. 11 is a flow chart describing use of the pressure-indexed valve 100 of FIG. 1. A string of oilfield equipment including a pressure-activated device, such as the pressure-indexed valve 100 whose indexing mechanism operates only when the pressure outside the pressure-indexed valve 100 exceeds the activation threshold, is assembled for insertion into a borehole (block 1105). The pressure-activated device is pressure tested (block 1110). The indexing mechanism of the pressure-indexed valve 100 is disabled during the pressure testing because the pressure outside the pressure-indexed valve 100 is below the activation threshold. The string is inserted into the borehole until the pressure on the outside diameter of the pressure-activated device exceeds the activation threshold (block 1115). Pressure in the borehole is sequentially increased and decreased to operate the indexing mechanism to cause the pressure-activated device to perform its function (block 1120).

In one aspect, an apparatus includes a piston chamber and a piston moveable within the piston chamber. The piston has a cylinder head and a pilot rod extending from the cylinder head. The apparatus has a check valve. The check valve has an open position in which fluid flow is permitted from a permanent fluid communication path to an equalizing fluid communication path and is permitted from the equalizing fluid communication path to the permanent fluid communication path. The check valve has a closed position in which fluid flow through the equalizing fluid communication path is permitted from the permanent fluid communication path to the equalizing fluid communication path and is not permitted from the equalizing fluid communication path to the permanent fluid communication path. The apparatus has a valve spring urging the check valve into the closed position, a piston spring urging the pilot rod of the piston into engagement with the check valve to urge the check valve into the open position, a gland surrounding pilot rod, an equalizing chamber between the cylinder head of the piston and the gland, and a hydrostatic fluid communication path between the equalizing chamber and a source of hydrostatic pressure.

Implementations may include one or more of the following. The check valve may have a check valve chamber extending longitudinally in the direction of movement of the pilot rod and having an upstream side and a downstream side, a ball moveable within the check valve chamber, engageable on an upstream side by the pilot rod, and engaged on the downstream side by the valve spring, and a seat against which the ball seals. The apparatus may have an entry chamber between the gland and the check valve. The entry chamber may be in fluid communication with the equalizing fluid communication path. The apparatus may have an exit chamber on the opposite side of the check valve from the entry chamber. The exit chamber may be in fluid communication with the permanent fluid communication path. The apparatus may include a locking mechanism to lock the check valve into the closed position. The locking mechanism may be coupled to the cylinder head of the piston. The apparatus may include a locking mechanism selected from the group consisting of a snap ring coupled to the cylinder head of the piston and a collet coupled to the cylinder head of the piston.

In one aspect, an apparatus includes a tubular housing having an inside diameter and an outside diameter. The apparatus includes a low pressure chamber in the tubular housing between the inside diameter and the outside diameter. The apparatus includes a permanent fluid communication path fluidly coupled to the low pressure chamber. The apparatus includes a high pressure chamber in the tubular housing between the inside diameter and the outside diameter. The apparatus includes a bleed valve between the high pressure chamber and the low pressure chamber. The apparatus includes an equalizing fluid communication path between the low pressure chamber and the high pressure chamber. The apparatus includes an indexing mechanism capable of indexing in the presence of a difference between a pressure in the low pressure chamber and a pressure in the high pressure chamber. The apparatus includes a piloted check valve fluidly coupled to the outside diameter of the tubular housing and operable to close when a fluid pressure at the outside diameter of the tubular housing exceeds an activation pressure. The piloted check valve is located to interrupt the equalizing fluid communication path upon closing.

Implementations include one or more of the following. The piloted check valve may have a piston chamber. The piloted check valve may have a piston moveable within the piston chamber. The piston may have a cylinder head and a pilot rod extending from the cylinder head. The piloted check valve may have a check valve. The check valve may have an open position in which fluid flow through the equalizing fluid communication path is permitted from the low pressure chamber to the high pressure chamber and is permitted from the high pressure chamber to the low pressure chamber. The check valve may have a closed position in which fluid flow through the equalizing fluid communication path is permitted from the low pressure chamber to the high pressure chamber and is not permitted from the high pressure chamber to the low pressure chamber. The piloted check valve may have a valve spring urging the check valve into the closed position. The piloted check valve may have a piston spring urging the pilot rod of the piston into engagement with the check valve to urge the check valve into the open position. The piloted check valve may have a gland surrounding the pilot rod. The piloted check valve may have an equalizing chamber between the cylinder head of the piston and the gland. The piloted check valve may have a hydrostatic fluid communication path between the equalizing chamber and the outside diameter of the tubular housing. The piloted check valve may have a check valve chamber extending longitudinally in the direction of movement of the pilot rod and having an upstream side and a downstream side. The piloted check valve may have a ball moveable within the check valve chamber, engageable on an upstream side by the pilot rod, and engageable on the downstream side by the valve spring. The piloted check valve may have a seat against which the ball seals. The apparatus may have an entry chamber between the gland and the check valve. The entry chamber may be in fluid communication with the low pressure chamber. The apparatus may have an exit chamber on the opposite side of the check valve from the entry chamber. The exit chamber may be in fluid communication with the high pressure chamber. The apparatus may include a locking mechanism to lock the check valve into the closed position. The locking mechanism may be coupled to the cylinder head of the piston. The apparatus may include a locking mechanism selected from the group consisting of a snap ring coupled to the cylinder head of the piston and a collet coupled to the cylinder head of the piston.

In one aspect, a method includes including in a string for insertion into a borehole a pressure-activated device. The pressure-activated device has an indexing mechanism. The pressure-activated device has a piloted check valve that prevents the indexing mechanism from operating unless a pressure on an outside diameter of the pressure-activated device exceeds an activation threshold.

Implementations may include one or more of the following. The method may include inserting the string into the borehole until the pressure on the outside diameter of the pressure-activated device exceeds the activation threshold. The method may include sequentially increasing and decreasing the pressure in the borehole to operate the indexing mechanism to cause the pressure-activated device to perform its function. The method of may include pressure testing the pressure-activated device before inserting the string into the borehole.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
   a piston chamber;
   a piston moveable within the piston chamber, the piston having a cylinder head and a pilot rod extending from the cylinder head;
   a check valve having:
      an open position in which fluid flow is permitted from a permanent fluid communication path to an equalizing fluid communication path and is permitted from the equalizing fluid communication path to the permanent fluid communication path, and
      a closed position in which fluid flow through the equalizing fluid communication path is permitted from the permanent fluid communication path to the equalizing fluid communication path and is not permitted from the equalizing fluid communication path to the permanent fluid communication path;
   a valve spring urging the check valve into the closed position;
   a piston spring urging the pilot rod of the piston into engagement with the check valve to urge the check valve into the open position;
   an equalizing chamber positioned between the cylinder head of the piston and the check valve; and
   a hydrostatic fluid communication path between the equalizing chamber and a source of hydrostatic pressure.

2. The apparatus of claim 1 wherein the check valve comprises:
   a check valve chamber extending longitudinally in the direction of movement of the pilot rod and having an upstream side and a downstream side;
   a ball moveable within the check valve chamber, engageable on an upstream side by the pilot rod, and engageable on the downstream side by the valve spring; and
   a seat against which the ball seals.

3. The apparatus of claim 1 further comprising:
   a gland surrounding the pilot rod, the equalizing chamber positioned between the cylinder head of the piston and the gland;
   an entry chamber between the gland and the check valve, the entry chamber being in fluid communication with the equalizing fluid communication path; and
   an exit chamber on the opposite side of the check valve from the entry chamber, the exit chamber being in fluid communication with the permanent fluid communication path.

4. The apparatus of claim 1 further comprising a locking mechanism to lock the check valve into the closed position.

5. The apparatus of claim 4 wherein the locking mechanism is coupled to the cylinder head of the piston.

6. The apparatus of claim 1 further comprising a locking mechanism selected from the group consisting of a snap ring coupled to the cylinder head of the piston and a collet coupled to the cylinder head of the piston.

7. An apparatus comprising:
a tubular housing having an inside diameter and an outside diameter;
a low pressure chamber in the tubular housing between the inside diameter and the outside diameter;
a permanent fluid communication path fluidly coupled to the low pressure chamber;
a high pressure chamber in the tubular housing between the inside diameter and the outside diameter;
a bleed valve between the high pressure chamber and the low pressure chamber;
an equalizing fluid communication path between the low pressure chamber and the high pressure chamber;
an indexing mechanism capable of indexing in the presence of a difference between a pressure in the low pressure chamber and a pressure in the high pressure chamber; and
a piloted check valve fluidly coupled to the outside diameter of the tubular housing and operable to close when a fluid pressure at the outside diameter of the tubular housing exceeds an activation pressure, the piloted check valve located to interrupt the equalizing fluid communication path upon closing.

8. The apparatus of claim 7 wherein the piloted check valve comprises:
a piston chamber;
a piston moveable within the piston chamber, the piston having a cylinder head and a pilot rod extending from the cylinder head;
a check valve having:
an open position in which fluid flow through the equalizing fluid communication path is permitted from the low pressure chamber to the high pressure chamber and is permitted from the high pressure chamber to the low pressure chamber, and
a closed position in which fluid flow through the equalizing fluid communication path is permitted from the low pressure chamber to the high pressure chamber and is not permitted from the high pressure chamber to the low pressure chamber;
a valve spring urging the check valve into the closed position;
a piston spring urging the pilot rod of the piston into engagement with the check valve to urge the check valve into the open position;
a gland surrounding the pilot rod;
an equalizing chamber between the cylinder head of the piston and the gland; and
a hydrostatic fluid communication path between the equalizing chamber and the outside diameter of the tubular housing.

9. The apparatus of claim 8 wherein the piloted check valve comprises:
a check valve chamber extending longitudinally in the direction of movement of the pilot rod and having an upstream side and a downstream side;
a ball moveable within the check valve chamber, engageable on an upstream side by the pilot rod, and engageable on the downstream side by the valve spring; and
a seat against which the ball seals.

10. The apparatus of claim 8 further comprising:
an entry chamber between the gland and the check valve, the entry chamber being in fluid communication with the low pressure chamber; and
an exit chamber on the opposite side of the check valve from the entry chamber, the exit chamber being in fluid communication with the high pressure chamber.

11. The apparatus of claim 8 further comprising a locking mechanism to lock the check valve into the closed position.

12. The apparatus of claim 11 wherein the locking mechanism is coupled to the cylinder head of the piston.

13. The apparatus of claim 8 further comprising a locking mechanism selected from the group consisting of a snap ring coupled to the cylinder head of the piston and a collet coupled to the cylinder head of the piston.

14. A method comprising:
including in a string for insertion into a borehole a pressure-activated device having an indexing mechanism and a piloted check valve that prevents the indexing mechanism from operating unless a pressure on an outside diameter of the pressure-activated device exceeds an activation threshold, the piloted check valve including a piston moveable within the piston chamber, the piston having a cylinder head and a pilot rod extending from the cylinder head, a check valve having an open position and a closed position, the open position permitting fluid flow through the equalizing fluid communication path from the low pressure chamber to the high pressure chamber and from the high pressure chamber to the low pressure chamber, the closed position permitting fluid flow through the equalizing fluid communication path from the low pressure chamber to the high pressure chamber and not permitting fluid flow from the high pressure chamber to the low pressure chamber, a valve spring urging the check valve into the closed position, and a piston spring urging the pilot rod of the piston into engagement with the check valve to urge the check valve into the open position.

15. The method of claim 14 further comprising:
inserting the string into the borehole until the pressure on the outside diameter of the pressure-activated device exceeds the activation threshold.

16. The method of claim 15 further comprising:
sequentially increasing and decreasing the pressure in the borehole to operate the indexing mechanism to cause the pressure-activated device to perform its function.

17. The method of claim 15 further comprising:
pressure testing the pressure-activated device before inserting the string into the borehole.

\* \* \* \* \*